(12) United States Patent  
Berus

(10) Patent No.: US 8,863,004 B2
(45) Date of Patent: Oct. 14, 2014

(54) METHOD AND APPARATUS FOR INCREASING THE FUNCTIONALITY OF A USER DEVICE IN A LOCKED STATE

(75) Inventor: Bernard Berus, Berlin (DE)

(73) Assignee: NAVTEQ B.V., Veldhoven (NL)

( * ) Notice: Subject to any disclaimer, the term of this patent is extended or adjusted under 35 U.S.C. 154(b) by 278 days.

(21) Appl. No.: 13/284,451

(22) Filed: Oct. 28, 2011

(65) Prior Publication Data

US 2013/0111408 A1    May 2, 2013

(51) Int. Cl.
*G06F 21/31* (2013.01)
*G06F 17/30* (2006.01)
*G06Q 10/10* (2012.01)

(52) U.S. Cl.
CPC .......... *G06F 21/31* (2013.01); *G06F 17/30873* (2013.01); *G06Q 10/10* (2013.01)
USPC ............. 715/741; 715/742; 715/743; 726/17; 726/18; 726/19

(58) Field of Classification Search
CPC ... G06F 21/31; G06F 17/30873; G06F 21/00; G06F 3/017; G06F 3/0482; G06Q 10/10
USPC ................................ 715/741–743; 726/17–19
See application file for complete search history.

(56) References Cited

U.S. PATENT DOCUMENTS

| | | | |
|---|---|---|---|
| 8,127,254 | B2 | 2/2012 | Lindberg et al. |
| 2007/0028176 | A1* | 2/2007 | Perdomo et al. ............... 715/741 |
| 2008/0220752 | A1* | 9/2008 | Forstall et al. ................. 455/415 |
| 2009/0205041 | A1 | 8/2009 | Michalske |
| 2010/0146384 | A1 | 6/2010 | Peev et al. |
| 2010/0159995 | A1* | 6/2010 | Stallings et al. ............... 455/566 |
| 2010/0269040 | A1 | 10/2010 | Lee |
| 2010/0306705 | A1 | 12/2010 | Nilsson |
| 2011/0093320 | A1* | 4/2011 | Blake et al. ................. 705/14.16 |
| 2011/0105193 | A1 | 5/2011 | Lee et al. |
| 2012/0046079 | A1* | 2/2012 | Kim et al. ..................... 455/566 |
| 2012/0182226 | A1* | 7/2012 | Tuli ............................... 345/173 |
| 2012/0214442 | A1* | 8/2012 | Crawford et al. ............. 455/411 |

FOREIGN PATENT DOCUMENTS

WO        2011047106 A1    4/2011

OTHER PUBLICATIONS

Notification of Transmittal of the International Search Report and the Written Opinion of the International Searching Authority, or the Declaration for International Application No. PCT/FI2012/051029 dated Oct. 26, 2012, pp. 1-13.
Englishtwist, "How to be notified of sms & emails on iPhone home screen", web page, pp. 1-3, uploaded Oct. 27, 2008.
Lang, "Samsung Galaxy S Fascinate Review", web page, pp. 1-5, www.carrypad.com/2010/11/15/samsung-galaxy-s-fascinate-review/5/.
Verizon 4GLTE Certified, Samsung Stratosphere a Galaxy S phone, User Manual, pp. 1-186.

* cited by examiner

*Primary Examiner* — Tadeese Hailu
(74) *Attorney, Agent, or Firm* — Ditthavong & Steiner, P.C.

(57) ABSTRACT

An approach is provided for increasing the functionality of a user device when the device is in an, at least in part, locked state. The approach involves presentation of a first user interface and rendering of at least a portion of a second user interface associated with the first user interface while the user device is in an, at least in part, locked state wherein the second user interface is associated with one or more applications and/or one or more services. Further, one or more interactions with the first user interface and/or with the at least a portion of the second user interface are detected and processed for at least changing the device to an, at least in part, unlocked state.

21 Claims, 12 Drawing Sheets

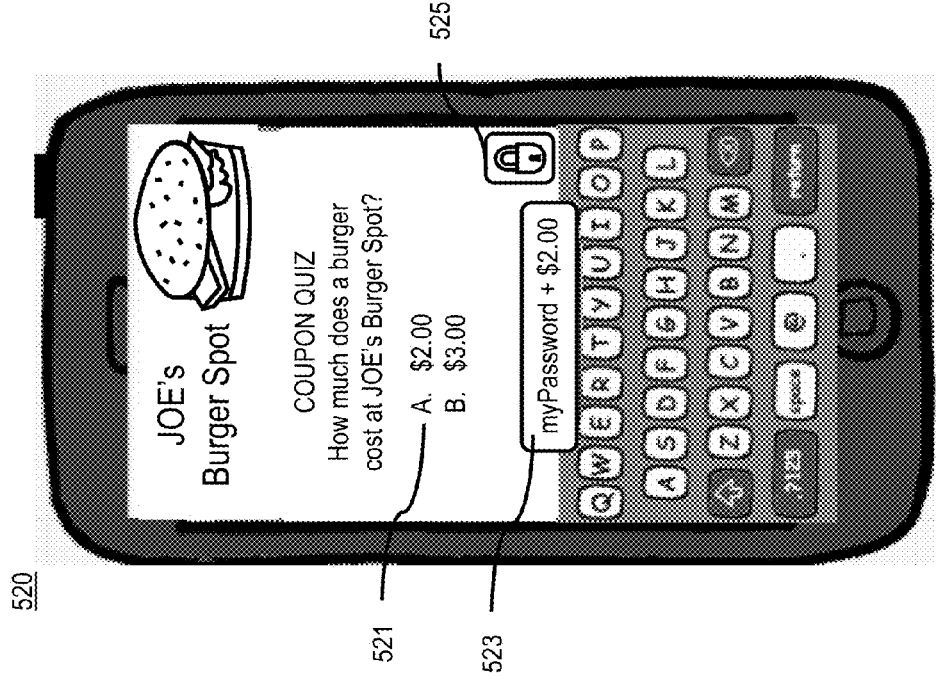
FIG. 5B
FIG. 5C

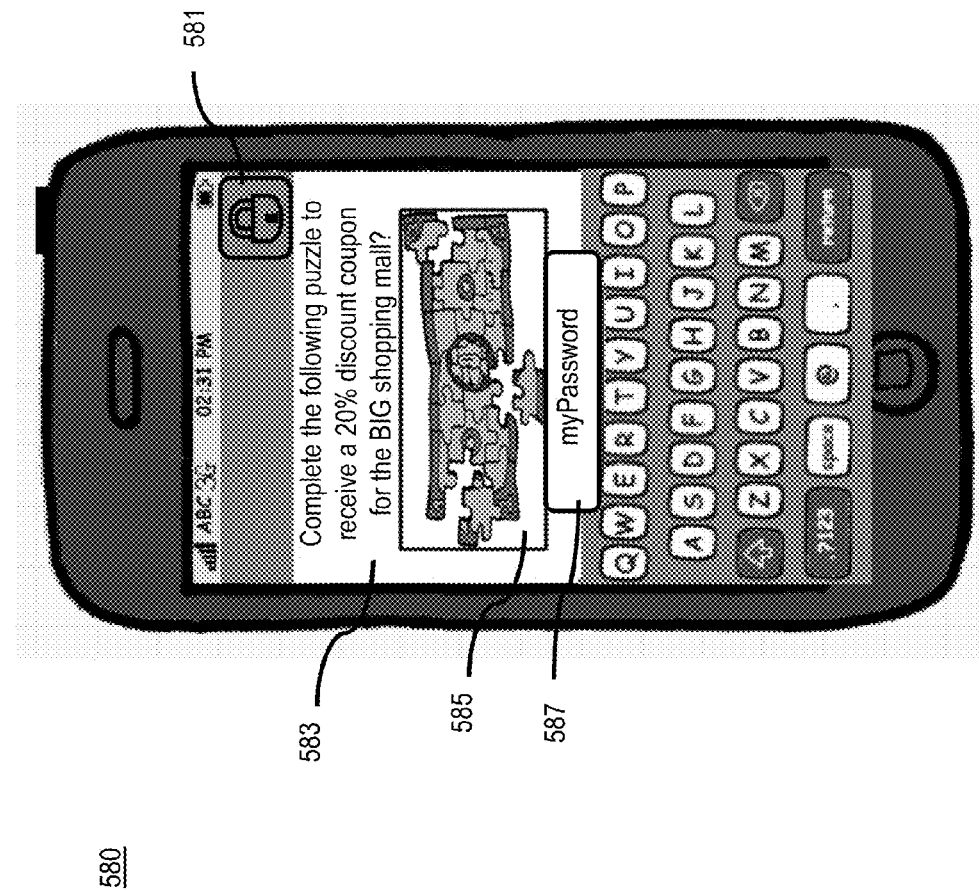

METHOD AND APPARATUS FOR INCREASING THE FUNCTIONALITY OF A USER DEVICE IN A LOCKED STATE

BACKGROUND

Service providers and device manufacturers (e.g., wireless, cellular, etc.) are continually challenged to deliver value and convenience to consumers by, for example, providing compelling network services. On a daily basis, users utilize different user devices (e.g., mobile phones, PDAs, computers, etc.) to perform various tasks (e.g., make phone calls, check emails, chat, log onto an internet service, etc.) User devices, such as those with touch screens and/or keypads, have a locking feature to avoid any accidental functioning and/or unauthorized use of the user device. The lock screen, however, requires additional time to unlock before accessing and using an application and/or a service that is run on the user device. There is a need, therefore, to increase the functionality of the user device while it is in an, at least in part, locked state. Some Example Embodiments Therefore, there is a need for an approach for increasing utility of a process for unlocking a user device while the device is in an, at least in part, locked state.

According to one embodiment, a method comprises causing, at least in part, a presentation of a first user interface associated with an, at least in part, locked state of a device. The method further comprises causing, at least in part, a rendering of at least a portion of a second user interface associated with the first user interface, wherein the second user interface is associated with one or more applications, one or more services, or a combination thereof. The method also comprises processing and/or facilitating a processing of one or more interactions with the first user interface, the at least a portion of the second user interface, or a combination thereof to cause, at least in part, a change of the device to an, at least in part, unlocked state.

According to another embodiment, an apparatus comprises at least one processor, and at least one memory including computer program code, the at least one memory and the computer program code configured to, with the at least one processor, cause, at least in part, the apparatus to cause, at least in part, a presentation of a first user interface associated with an, at least in part, locked state of a device. The apparatus is further caused to cause, at least in part, a rendering of at least a portion of a second user interface associated with the first user interface, wherein the second user interface is associated with one or more applications, one or more services, or a combination thereof. The apparatus is also caused to process and/or facilitate a processing of one or more interactions with the first user interface, the at least a portion of the second user interface, or a combination thereof to cause, at least in part, a change of the device to an, at least in part, unlocked state.

According to another embodiment, a computer-readable storage medium carries one or more sequences of one or more instructions which, when executed by one or more processors, cause, at least in part, an apparatus to cause, at least in part, a presentation of a first user interface associated with an, at least in part, locked state of a device. The apparatus is further caused to cause, at least in part, a rendering of at least a portion of a second user interface associated with the first user interface, wherein the second user interface is associated with one or more applications, one or more services, or a combination thereof. The apparatus is also caused to process and/or facilitate a processing of one or more interactions with the first user interface, the at least a portion of the second user interface, or a combination thereof to cause, at least in part, a change of the device to an, at least in part, unlocked state.

According to another embodiment, an apparatus comprises means for causing, at least in part, a presentation of a first user interface associated with an, at least in part, locked state of a device. The apparatus also comprises means for causing, at least in part, a rendering of at least a portion of a second user interface associated with the first user interface, wherein the second user interface is associated with one or more applications, one or more services, or a combination thereof. The apparatus further comprises means for causing to process and/or facilitate a processing of one or more interactions with the first user interface, the at least a portion of the second user interface, or a combination thereof to cause, at least in part, a change of the device to an, at least in part, unlocked state.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 5A-5F are diagrams of user interfaces utilized in the processes of FIGS. 3 and 4, according to various embodiments;

DESCRIPTION OF SOME EMBODIMENTS

Examples of a method, apparatus, and computer program for increasing utility of a process for unlocking a user device while the device is in an, at least in part, locked state are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
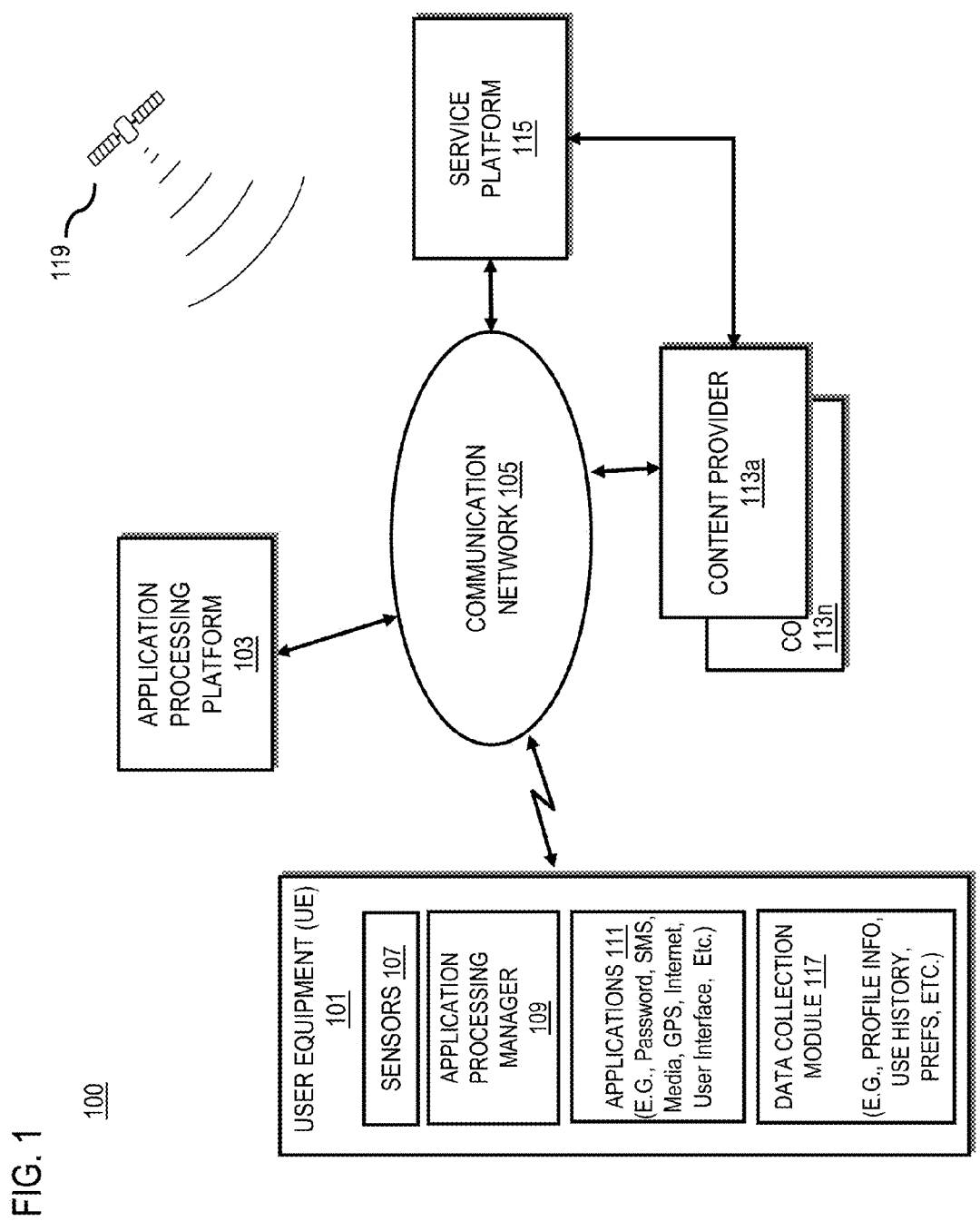
FIG. 1 is a diagram of a system capable of increasing utility of a process for unlocking a user device while the device is in an, at least in part, locked state, according to one embodiment.

FIG. 1 is a diagram of a system capable of increasing utility of a process for unlocking a user device while the device is in an, at least in part, locked state, according to one embodiment. Users utilize one or more user devices throughout the day for accomplishing tasks, communicating with others, entertainment, infotainment, education and the like. Further, the user devices, such as those with touch screens, have a lock screen feature to avoid any accidental functioning of the user device and/or to prevent unauthorized use of the user device. As a result, a user typically has to interact with the user device (e.g., enter a password/passcode) several times per day (unlocking times) to unlock it before utilizing it. The unlocking procedure may occur in any situation, for example, the user may have some available time (e.g., travelling on a train, waiting for a bus, waiting at an airport, etc.) and may wish to further interact with the user device during the unlocking of the user device. As such, one or more applications on the user device and/or a service provider can present one or more tasks, challenges, questions and the like to the unlocking process wherein one or more services (e.g., informational, educational, entraining, advertising, value added services, location-based, user defined, service-provider defined, etc.) can be presented to the user. For example, it is lunch-time and a user is walking by a restaurant while attempting to unlock his user device for utilization. Further, a service provider causes a challenge-question and a discount coupon for the nearby restaurant to be presented to the user when the user attempts to unlock the user device and upon answering the question and unlocking the user device, the discount coupon is presented to the user. Under the approach of the various embodiments described herein, the user would then have the option to unlock the device using a normal procedure, or to unlock the device by interacting with or responding to the challenge-question to unlock the device.

Accordingly, a system 100 of FIG. 1 introduces the capability to combine functionality of particular applications with an unlocking process at a user device (e.g., when the user device is locked) and to efficiently present one or more beneficial services to the user. For example, when a user wants to unlock a device (e.g., indicated by the user activating the screen of an, at least in part, locked device), the system 100 can display the normal unlocking user interface with additional user interface elements from a second or unrelated application or user interface. In one embodiment, The second application or user interface can (1) present information (e.g., advertising information); (2) display a competition question, poll, or etc; (3) request any interaction with another application presented in the lock screen; and the like. Then, depending on how the user chooses to interact with the lock screen (e.g., unlock the screen normally, answer a challenge or poll question, interact with the other application, etc.), the system 100 can unlock the device and provide additional functionality based on the nature of the interactions and the applications supporting the interactions.

In other words, the system 100 enables one or more applications to determine when a user device is in an, at least in part, locked state, determine when a user attempts to unlock the user device and determine to combine functionalities of one or more applications with the unlocking process for presenting one or more services, contents and/or applications to the user.

For example, steps of combining one or more applications with unlocking process of a user device such as that discussed above may be as follows: get the user device from the user's pocket, press a key on a keypad or press the power button, an application on the user device indicates that the user device is in an, at least in part, locked state, presents a first user interface prompting the user to enter a user password, present a second user interface prompting the user to interact with the second user interface wherein upon receiving correct entries in both the first and second user interfaces, the user device is unlocked and one or more applications, services and/or contents are presented to the user either preceding or succeeding the unlocking of the user device. In this example, the application or a sub-process of the application for presenting the second user interface in an, at least in part, locked state can be running and accessible without having to unlock the phone, search for the application, access the application and run the application. Such an implementation may be based on close integration between a device's software and an application processing manager because lock screen content and behavior is usually controlled by the device's resident operating system. In one embodiment, the integration may be enabled by an operating system provided application programming interface to access lock screen rendering and functionality.

In various embodiments, a user device may be locked by a user and/or may have one or more predefined and/or configurable configurations for automatically locking the user device wherein portions of a touch screen area and/or a keypad area of the user device would be locked in order to prevent accidental operation and/or unauthorized use of the device. Further, a user may initiate an unlocking process by interacting with the user device via one or more keys on a keypad, a power button, a touch on one or more portions of a touch screen, audio (e.g., voice input), video (e.g., facial gestures), hand gestures and movements, or a combination thereof wherein the user may enter/submit one or more user passwords/passcodes for unlocking the user device for utilization.

As shown in FIG. 1, the system 100 comprises a user equipment (UE) 101 having connectivity to an application processing platform 103, content providers 113a-113n (collectively referred to as content provider 113), and a service platform 115 via a communication network 105. In one embodiment, the UE 101 has sensors 107 the detect context information about the location of the UE 101 and/or orientation information about the UE 101. The UE 101 may be in an, at least in part, locked state, and once a display is activated, the UE 101 displays one or more applications 111 such as a user interface, a map, a media player, a web browser, a messaging application, that may be one of many applications functioning in the locked state. The UE 101 may switch between applications 111 and/or alternative views based on a movement of and/or an attempt to utilize the UE 101, which may be detected by the sensors 107, application processing manager 109 and/or one or more applications 111. The application processing platform 103 may be resident within the UE 101 or external to the UE 101 and/or the functionality of the application processing platform 103 may be replaced or shared by an application processing manager 109 that is resident within the UE 101. For simplicity, the application processing manager 109 will be described in the context of the application processing platform 103, herein. The application processing platform 103 may determine whether a switch or a button of the UE 101 has been actuated, whether a standard power mode or a low power mode should be activated on the UE 101 for running an application in the locked state, and process any context information that the processing platform 103 may receive by way of the sensors 107, for example. In one embodiment, the UE 101 includes a data collection module 117 for collecting information such as user profile information, use history, user preferences, location information and the like. In certain embodiments, one or more GPS satellites 119 may be utilized in determining the location of the UE 101 in connection with one or more spatiotemporal or GPS transceivers of the data collection module 117.

Further, one or more information items presented/submitted by a user during an unlocking process may be presented for evaluation to the service platform 115, the content provider 113 and/or the application processing platform 103 via a communication network 105.

Furthermore, one or more content items include one or more identifiers, metadata, access addresses (e.g., network address such as a Uniform Resource Locator (URL) or an Internet Protocol (IP) address; or a local address such as a file or storage location in a memory of the UE 101, description, or the like associated with the content. In one embodiment, content includes live media (e.g., streaming broadcasts), stored media (e.g., stored on a network or locally), metadata associated with media, text information or a combination thereof. Also, the content may be provided by the service platform 115 which (e.g., music service, mapping service, video service, social networking service, content broadcasting service, etc.), the content provider 113 (e.g., online content retailers, public databases, etc.) and/or other content sources available or accessible via the communication network 105.

By way of example, the UE 101 may execute the applications 111 to receive content and/or mapping information from the content provider 113 or other components of the communication network 105. As mentioned above, the UE 101 may utilize GPS satellites 119 and/or assisted GPS (A-GPS) to determine the location of the UE 101 to utilize one or more contents and/or one or more location-based services provided by the service platform 115.

In certain embodiments, the UE 101 may be in an, at least in part, locked state and when a user attempts to unlock the user device, the application processing manager 109 may cause, at least in part, a combining of one or more applications with a password application for unlocking the user device. For example, a UE 101 is in an, at least in part, locked state and a user attempts to unlock the UE 101. The application processing manager 109 presents a password application and substantially concurrently one or more other applications (e.g., a media item, a map, a text box, etc.) on the user interface of the UE 101.

In one embodiment, a first user interface (UI) associated with an, at least in part, locked state of a user device is presented to a user. For example, the UI prompts the user to enter a password wherein the password may include one or more entries of textual, numerical, graphical, biometric, and the like parameters. For example, a user has setup a password including text, special and numerical characters, for example, "football-is-number-1". In another example, the password is an audio capture of the user's voice uttering a predefined number of words (e.g., "I love soccer").

In various embodiments, one or more portions of a second user interface are presented associated with the first user interface, wherein the second user interface is associated with one or more applications and/or one or more services, wherein the one or more applications and/or the one or more services relate, at least in part, to an advertising service, a polling service, a competition service, a testing service and the like. For example, a user is presented with a question/challenge and a prompt (e.g., a second UI) for entering/selecting an answer to the question wherein the prompt may be combined and/or integrated with the first UI. In another embodiment, one or more interactions with the first user interface and/or with the one or more portions of the second user interface are determined and/or are processed to cause, at least in part, a change of the device to an, at least in part, unlocked state. For example, (1) a user attempts to unlock a user device, (2) is prompted in a first prompt (e.g., in a first UI) to enter his predefined password (e.g., a numeric code), (3) is prompted in a second prompt (e.g., a second UI) to enter/select (e.g., second entry) between a list of burger restaurants.

In other embodiments, the one or more applications, the one or more services and/or the one or more interactions are determined, at least in part, by the device, a service provider, a content provider and the like. In one embodiment, the application processing manager 109 on the user device determines the one or more interactions between the user and the user device, for example, whether the user correctly answered a question presented in the second prompt. In another embodiment, the one or more interactions are processed by a service provider to ascertain validity of the user response. For example, the service provider may have presented a question (e.g., what is the cost of a burger?) related to a certain vendor (e.g., Joe's Burgers), wherein one or more incentives (e.g., a coupon for Joe's Burgers) can be presented to the user upon receiving a correct response from the user.

In various embodiments, the user has a choice to ignore the second prompt and proceed to present the password for evaluation by an application (e.g., a password application) for unlocking the device, or the user can respond to the second prompt wherein the first entry (e.g., the password entry) and the second entry (e.g., a selection of a burger restaurant) are presented to one or more applications for evaluation and for unlocking the device, and wherein one or more applications, one or more services or a combination thereof may be presented on a UI preceding or succeeding an unlocking of the user device.

In another embodiment, one or more interactions by the user with the user device are processed in order to determine whether one or more functions of one or more applications and/or one or more services are to be initiated. For example, if the user elects to interact with the second prompt (e.g., answers a questions presented in the second UI portion), then one or more applications and/or services (e.g., an application to present a coupon) may be initiated. In another example, if the user decides not to interact with the second prompt (e.g., ignore, cancel, etc.) then the password entered by the user in the first prompt is evaluated and if valid, the user device is unlocked.

In another embodiment, one or more content items may be cached at the user device (e.g., stored at the storage device in the user device). For example, a service provider can send (e.g., via a wireless service, via internet, etc.) to the user device one or more contents (e.g., applications, widgets, contents, services and the like) so that the user device may store the one or more contents at the user device and utilize them as needed. In a user case scenario, a service provider sends several coupons (e.g., related to one or more services and/or products) to a user device and the user device stores the coupons at a local storage. Further, the user device can monitor user activity (e.g., user is near a shopping mall) and can utilize one or more of the contents to present to the user, if the user attempts to unlock the user device while near the shopping mall. In another embodiment, the user device may contact a service provider and/or a content provider to request for one or more contents, for example, while the user device is idle, or there are no more locally stored contents, or free and/or low cost connection is available, or remaining locally stored content does not match user preferences and the like.

In another embodiment, one or more interactions by the user with the user device can cause, at least in part, a generation of the one or more content items. For example, the application processing manager 109 may determine that the last interaction by the user with the user device before the user device was locked (e.g., by the user or automatically) was that the user was consuming a media item (e.g., listening to a musical album by an artist) wherein the application processing manager 109, the service platform 115 and/or the content provider 113 can cause to generate one or more content items related to the media item (e.g., short segment of a new song by the artist) and present it (e.g., play it) to the user during the next unlocking process if the user chooses to accept the content.

In another embodiment, one or more interactions by the user with the user device are processed to determine one or more applications, one or more services, or a combination thereof. For example, a user may be utilizing an application on the user device to study/learn a language; further the application processing manager 109 can determine to combine with the unlocking process a presentation of a language skills task (e.g., translation of a word into a different language). In another embodiment, the user can predefine that anytime the user attempts to unlock the user device, the application processing manager 109 should cause one more applications to present a predefined task for the user (e.g., translate a word into a target language) wherein the application processing manager 109 can cause the one or more applications and/or the one or more services from a local storage, from a service provider and/or a content provider. In another example, the user may be touring a museum and attempts to unlock his user device wherein the application processing manager 109 can combine with the unlocking process a presentation of an image of a painting being exhibited in the museum and further can present a question related to the painting.

In another embodiment, one or more interaction histories are generated based, at least in part, on one or more interactions by the user with the user device. For example, the application processing manager 109 can generate an interaction history indicating that a user has elected to interact more frequently with one or more particular applications and/or services than other applications and/or services. In various embodiments, the service platform 115 and/or the content provider 113 may collect the user interaction information and generate one or more interaction histories.

In another embodiment, by processing the interaction history, the application processing manager 109, the service platform 115 and/or the content provider 113 can determine one or more applications and/or one or more services to be rendered/presented to the user during an unlocking process. For example, a user interaction history may indicate that the user favors interaction with certain types of applications and/or service. For example, an interaction history may indicate that a user more frequently interacts with sports related applications and/or services. In another example, a user may be interacting with applications and/or services only during certain time of the day (e.g., during lunch time, after office hours, etc.)

In one embodiment, the application processing manager 109, the service platform 115 and/or the content provider 113 can cause, at least in part, an initiation of one or more applications and/or one or more services based, at least in part, on a change of the user device to an, at least in part, unlocked state. For example, if a user elects to interact with a second prompt during an unlocking process of the user device, then once the user device is in the unlocked state, one or more applications and/or one or more services can be initiated and presented to the user. In another example, if during the unlocking process the user interacted with a second prompt related to a service (e.g., music download), then once the user device is unlocked, one or more applications and/or one or more services are initiated and presented to the user in a UI wherein the user may further interact with the one or more applications and/or one or more services (e.g., follow a link to a music website.) In another embodiment, one or more applications and/or one or more services initiated in the locked state may continue on to the unlocked state of the user device. For example, if during an unlocking process of a user device a user interacted with one or more applications and/or one or more services (e.g., music download), then the one or more applications and/or the one or more services may continue on and initiate one or more applications and/or one or more services (e.g., launch an application, connect to a website, play a musical selection identified in the second prompt in the unlocking process and/or download the musical selection.)

In certain embodiments, the UE 101 may be running an application in an, at least in part, locked state and wherein the application may have multiple views or user interfaces available. The user, in this embodiment, may switch between views, user interfaces, or applications by actuating a switch (e.g., physical or virtual) that is part of the UE 101. For example, the user may hit a power button on the UE 101 to activate a display, and may then hit the power button again, or a volume button to change the view.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the sensors 107 may be any of a camera, an orientation sensor, a movement sensor, a location sensor, a proximity sensor, a light sensor and the like.

By way of example, the UE 101, the application processing platform 103, the content provider 113; and service platform 115 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
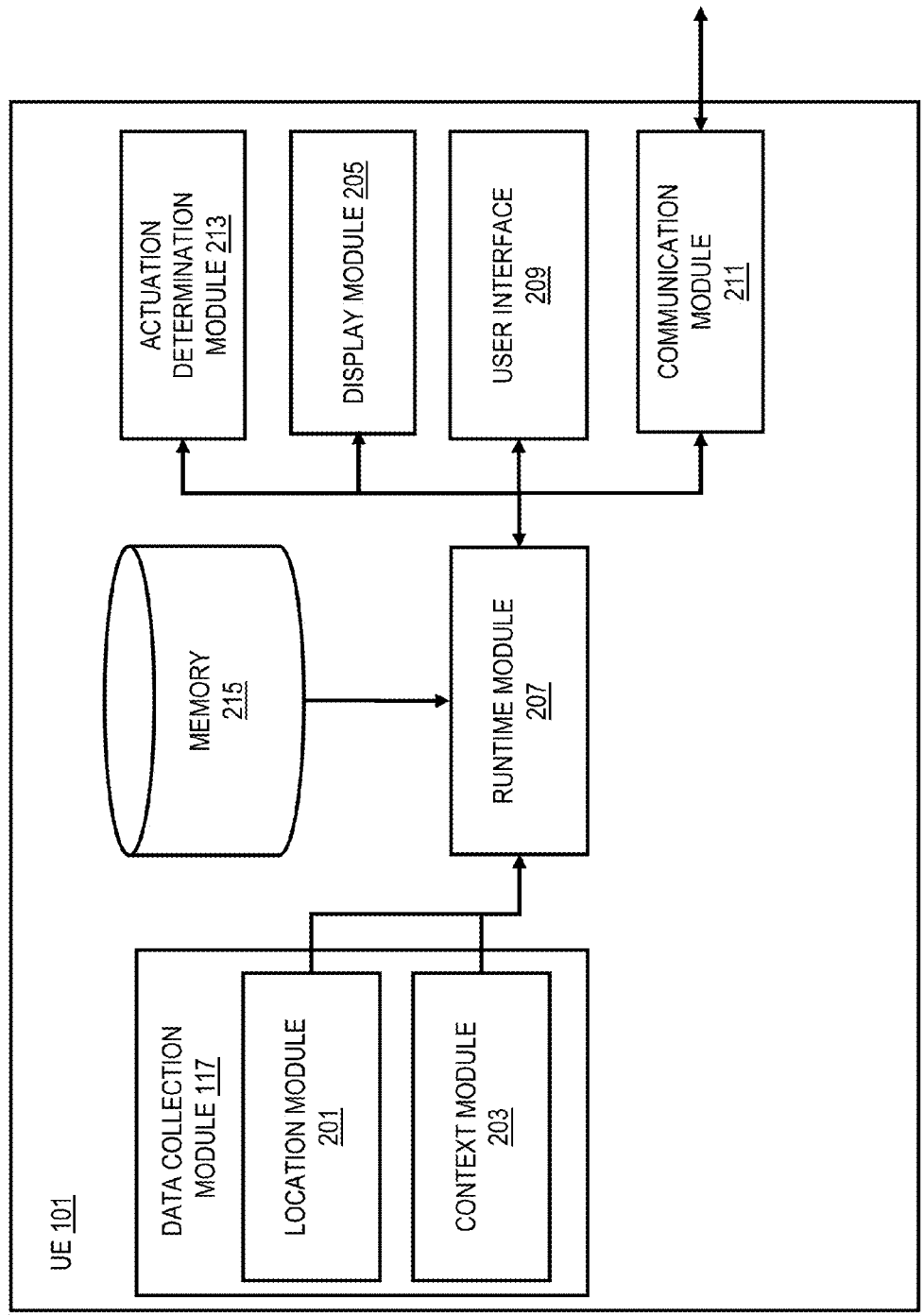
FIG. 2 is a diagram of components of a user equipment capable of an application processing platform, according to one embodiment.

FIG. 2 is a diagram of the components of the UE 101 capable of associating one or more applications with an, at least in part, locked state of the UE 101, according to one embodiment. By way of example, the UE 101 includes one or more components for increasing the functionality of a user device while the device is in an, at least in part, locked state. It is contemplated that the functions of these components may be combined in one or more components or performed by other components of equivalent functionality. In this embodiment, the UE 101 includes a data collection module 117 that may include one or more location modules 201, context modules 203, and display modules 205. The UE 101 can also include a runtime module 207 to coordinate use of other components of the UE 101, a user interface 209, a communication interface 211, an actuation determination module 213, and memory 215. An application 111 (e.g., a location-based services application) of the UE 101 can execute on the runtime module 207 utilizing the components of the UE 101.

As mentioned previously, the location module 201 can determine a user's location, which can be determined by a triangulation system such as GPS, assisted GPs (A-GPS), Cell of Origin, or other location extrapolation technologies. Standard GPS and A-GPS systems can use GPS satellites 119 to pinpoint the location of a UE 101. The location module 201 may also utilize multiple technologies to detect the location of the UE 101, for example, a Cell-of-Origin system can be used to determine the cellular tower that a cellular UE 101 is synchronized with. This information provides a coarse location of the UE 101 because the cellular tower can have a unique cellular identifier (cell-ID) that can be geographically mapped. Location coordinates (e.g., GPS coordinates) can give finer detail as to the location of the UE 101 when one or more location-based services are utilized and synchronized with the communication network 105.

The context module 203 receives context information by way of the communication module 211 about the UE 101 that may be detected by the sensors 107. A user profile may also be resident on the UE 101 or receivable from another network entity that communicates with the application processing platform 103. The context information that is received may be processed by the context module 203 to determine locations of interest to a user of the UE 101 such as landmarks, restaurants, bars, transportation information, hotels, etc. The display module 205 determines what information is to be displayed, and based on the determination made by the actuation determination module 213, determines which user interface or view of the application or other applications is to be displayed.

In one embodiment, the communication module 211 can be used to communicate with a service platform 115 or other UEs 101. Certain communications can be via methods such as an internet protocol, messaging (e.g., SMS, MMS, etc.), or any other communication method (e.g., via the communication network 105). In some examples, the UE 101 can send a request to the content provider 113 and/or to the service platform 115 via the communication module 211. The content provider 113 and/or the service platform 115 may then send a response back via the communication module 211. In certain embodiments, location and/or orientation information is used to generate a request for content and/or services.

The user interface 209 can include various methods of communication. For example, the user interface 209 can have outputs including a visual component (e.g., a screen), an audio component, a physical component (e.g., vibrations), and other methods of communication. User inputs can include a touch-screen interface, a scroll-and-click interface, a button interface, a microphone, etc. Moreover, the user interface 209 may be used to display maps, navigation information, camera images and streams, augmented reality application information, POIs, virtual reality map images, panoramic images and the like from the memory 215 and/or received via the communication module 211. Input can be via one or more methods such as voice input, textual input, typed input, typed touch-screen input, other touch-enabled input, etc. Further, the user interface 209 can additionally be utilized to add content, interact with content, manipulate content, or the like. Further, the user interface 209 may be utilized to filter content from a presentation and/or select criteria. Moreover, the user interface may be used to manipulate objects, cause presentation of images or a combination thereof.

Figure 3:
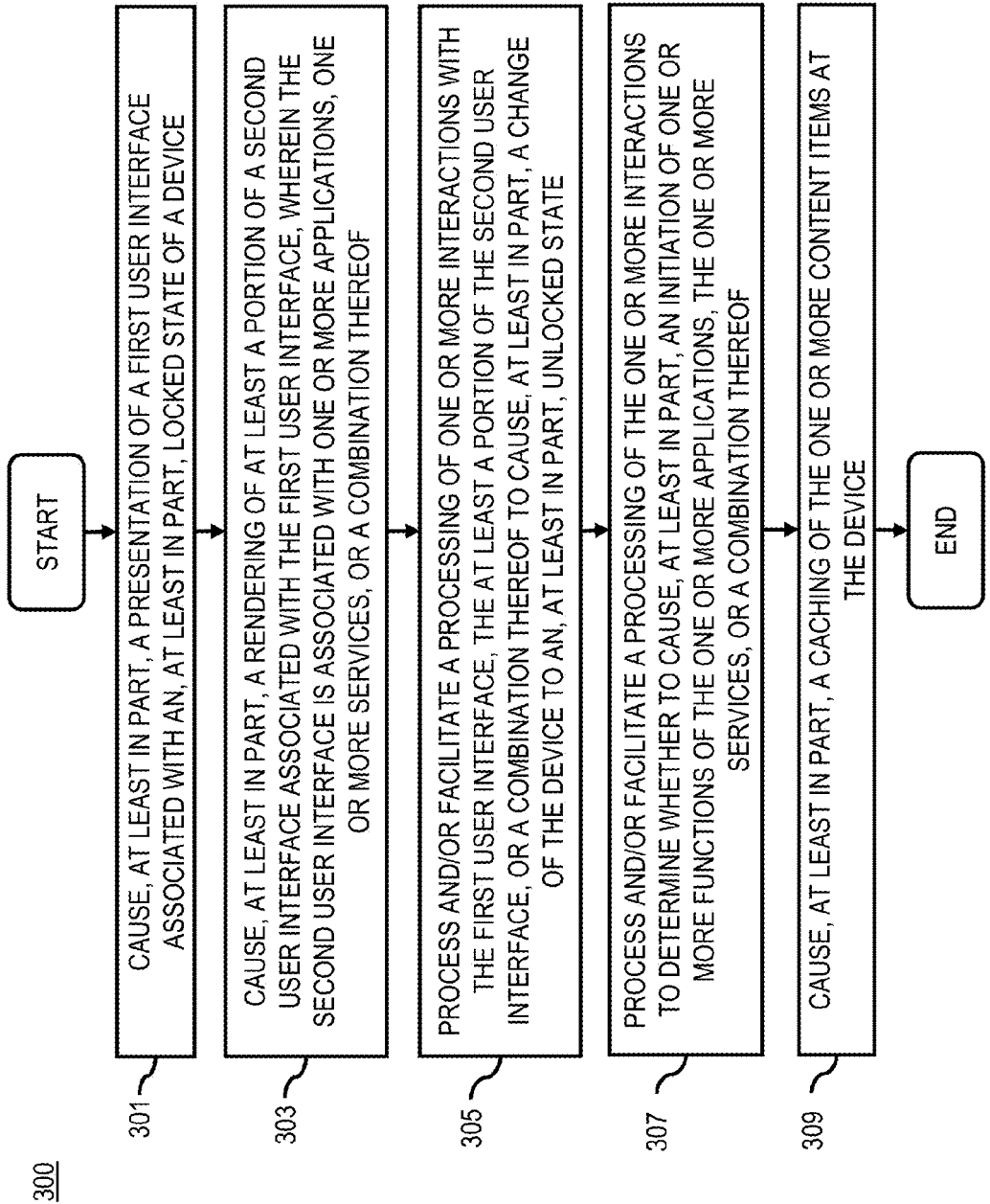
FIG. 3 is a flowchart of a process for presenting a first and a second user interface associated with an, at least in part, locked state of a user device, according to one embodiment.
Figure 7:
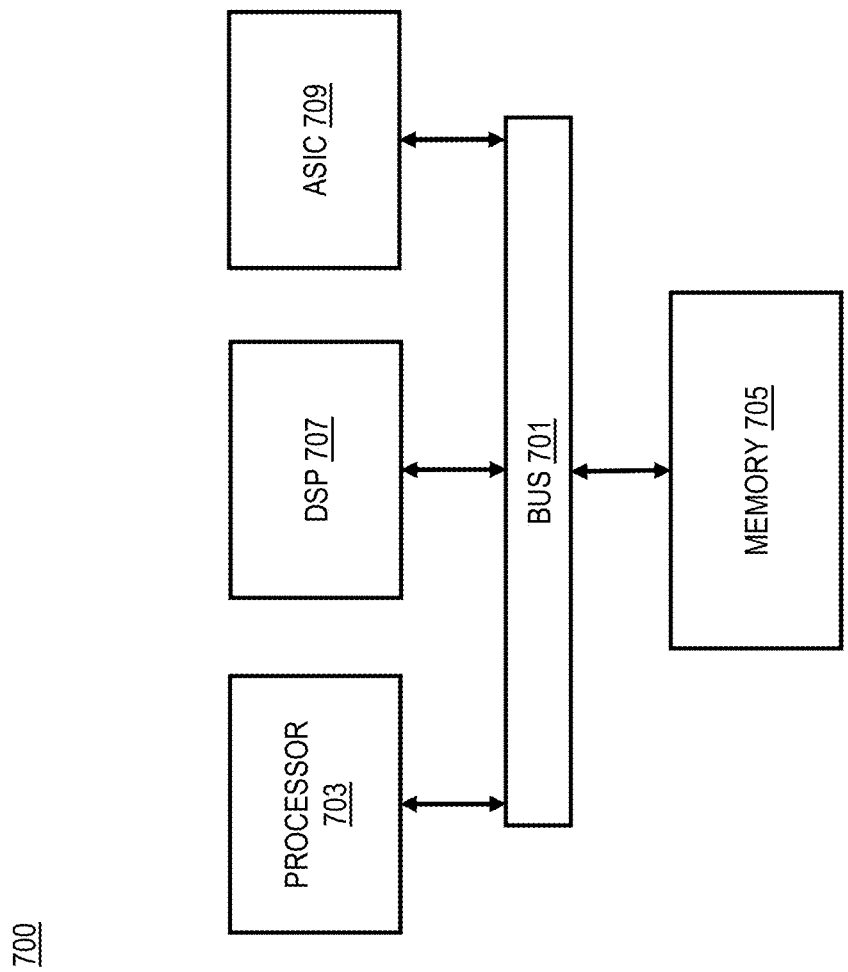
FIG. 7 is a diagram of a chip set that can be used to implement an embodiment of the invention.

FIG. 3 is a flowchart of a process for presenting a first and a second user interface associated with an, at least in part, locked state of a user device, according to one embodiment. In one embodiment, the application processing manager 109 performs the process 300 and is implemented in, for instance, a chip set including a processor and a memory as shown in FIG. 7. As such, the application processing manager 109 and/or runtime module 207 can provide means for accomplishing various parts of the process 300 as well as means for accomplishing other processes in conjunction with other components of the UE 101 and/or service platform 115.

In step 301, the application processing manager 109 causes, at least in part, a presentation of a first user interface associated with an, at least in part, locked state of a device. In one embodiment, one or more portions of one or more user interfaces (e.g., a touch screen, a keypad, etc.) on UE 101 are locked. In one embodiment, one or more sensors on the UE 101 (e.g., a power button, a key on a keypad, an accelerometer, etc.) detect one or more interactions (e.g., a touch on the screen, a key press, a movement of the UE 101, etc.) Further, upon detection of the one or more interactions, the application processing manager 109 present a UI wherein a user may enter/submit one or more passwords (e.g., textual, numerical, audio, biometrical, a combination thereof, etc.) for evaluation.

In step 303, the application processing manager 109 causes, at least in part, a rendering of at least a portion of a second user interface associated with the first user interface, wherein the second user interface is associated with one or more applications, one or more services, or a combination thereof. In one embodiment, a second prompt is presented whereby the user may interact with the second prompt for accomplishing one or more tasks. For example, the second prompt may present a question (e.g., "what is a latest game available for game console X") and ask the user to select an answer from a list of available answers. In another example, the user may be asked to pronounce one or more words at the UE 101 wherein one or more applications at the UE 101 and/or at a service provider can process the pronounced one or more words for further utilization by one or more applications (e.g., a password application). In various embodiments, the one or more applications, the one or more services and/or one or more content items relate, at least in part, to an advertising service, a polling service, a competition service, a testing service, or a combination thereof. In other embodiments, the one or more applications, the one or more services and/or the one or more interactions are determined, at least in part, by the device, a service provider, a content provider and the like. In one embodiment, the application processing manager 109 on the user device determines the one or more interactions between the user and the user device, for example, whether the user elected to participate in a community challenge question. In another embodiment, the one or more interactions are processed by a service provider to ascertain validity of the user response. For example, the service provider may quiz the user about a last walking-marathon that the user attended.

In step 305, the application processing manager 109 processes and/or facilitates a processing of one or more interactions with the first user interface, the at least a portion of the second user interface, or a combination thereof to cause, at least in part, a change of the device to an, at least in part, unlocked state. In one embodiment, a password by a user comprising, for example, text, numbers, biometric parameters, audio, and the like is detected and/or processed. In another embodiment, a password by a user and a user interaction comprising, for example, an entry (e.g., textual, numerical, graphical, an audio capture, a gesture, etc.) into a second portion of a user interface and/or a user action are detected. For example a user enters a user password and enters/selects an answer to a question presented at the UE 101.

In step 307, the application processing manager 109 processes and/or facilitates a processing of the one or more interactions to determine whether to cause, at least in part, an initiation of one or more functions of the one or more applications, the one or more services, or a combination thereof. In various embodiments, a user may choose to interact, ignore, cancel, postpone, etc. interaction with a second prompt wherein one or more applications and/or services may be initiated based, at least in part, on the user interaction. For example, if user chooses to interact with the second prompt, one or more applications can be initiated on the UE 101.

In step 309, the application processing manager 109 processes and/or facilitates a processing of the one or more interactions to cause, at least in part, a generation of the one or more content items. In one embodiment, user chooses to interact with a second prompt (e.g., advertising) which causes one or more applications and/or a service provider to initiate further functionalities of one or more applications and/or services. In another embodiment, a user elects not to interact with the second prompt and instead proceed to cause an unlocking of the UE 101. In another embodiment, the user chooses to postpone interacting with the second prompt (e.g., interact with a language skills prompt after the UE 101 is unlocked).

Figure 4:
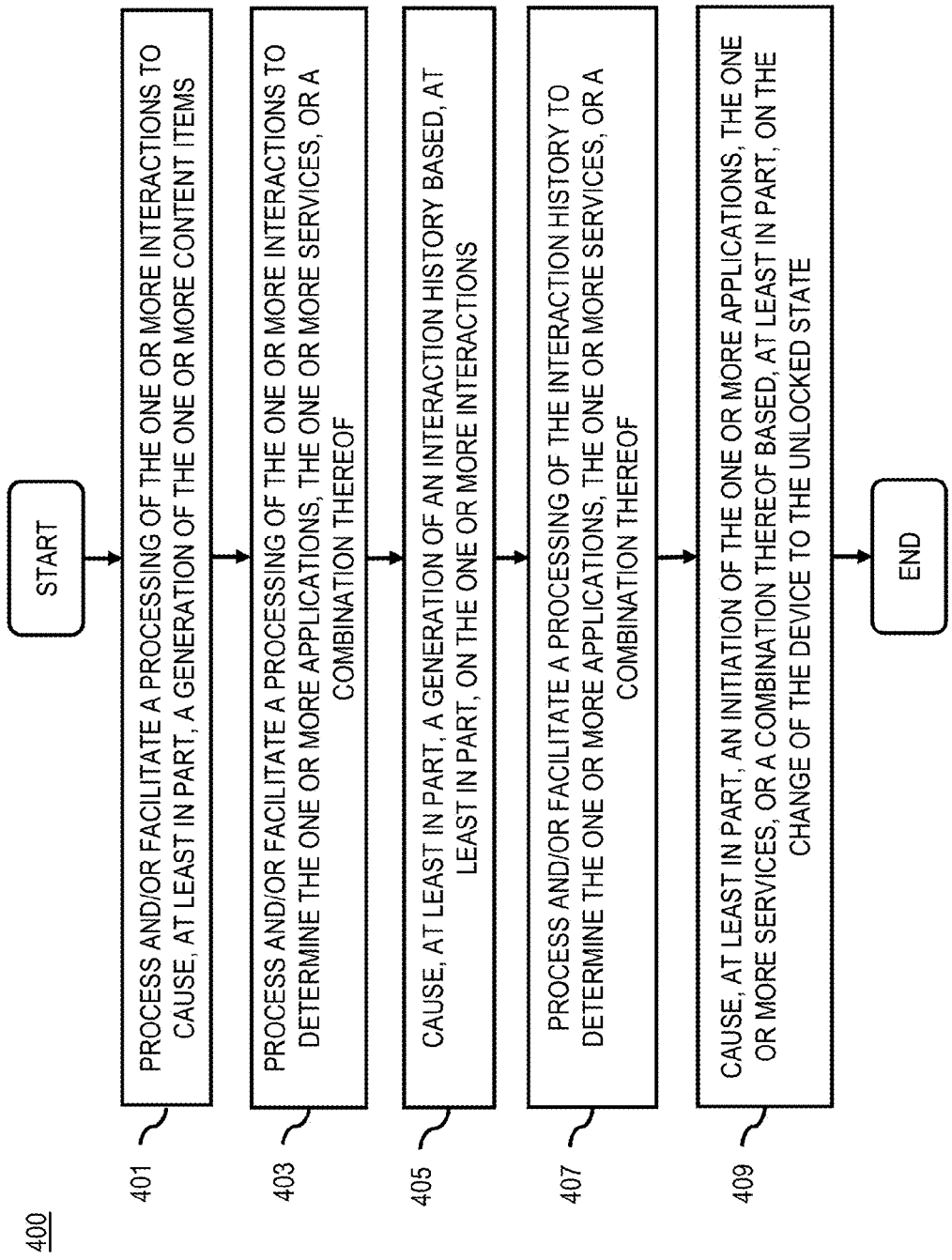
FIG. 4 is a flowchart of a process for processing user interactions and determining one or more applications, according to one embodiment.

FIG. 4 is a flowchart of a process for processing user interactions and determining one or more applications, according to one embodiment. In one embodiment, the application processing manager 109 performs the process 400 and is implemented in, for instance, a chip set including a processor and a memory as shown in FIG. 7. As such, the application processing manager 109 and/or runtime module 207 can provide means for accomplishing various parts of the process 400 as well as means for accomplishing other processes in conjunction with other components of the UE 101 and/or service platform 115.

In step 401, the application processing manager 109 causes, at least in part, a caching of the one or more content items at the device. In one embodiment, one or more content items are cached at the user device (e.g., stored at the storage device of UE 101). For example, a service provider can send (e.g., via a wireless service, via internet, etc.) to the user device one or more contents so that the user device may store the one or more contents at the user device and utilize them as needed. For example, a service provider sends several words to be used in language learning skills in a language defined by the user. In another example, a service provider sends one or more questions related to an on-line game application so that the UE 101 can save them at a UE 101 local storage. In various embodiments, the user device can request for one or more contents for local storage, for example, when content availability at a local storage is low, the user has changed user's preferences, user's content consumption has changed and the like.

In step 403, the application processing manager 109 processes and/or facilitates a processing of the one or more interactions to determine the one or more applications, the one or more services, or a combination thereof. In one embodiment, one or more applications, service providers and/or content providers can determine a user interacting with a second prompt and/or other prompts in order to determine what application, service and/or content to present to the user. For example, a user may choose to partake in a survey related to a local gym wherein one or more coupons for one or more services (e.g., nutritional evaluation) can be presented to the user which may follow by a quiz related to calories in a certain food item. Further, a link to an online nutrition evaluation site is provided wherein, further, an application for accessing the online site is launched.

In step 405, the application processing manager 109 causes, at least in part, a generation of an interaction history based, at least in part, on the one or more interactions. In one embodiment, one or more applications on the user device UE 101 generates/creates one or more logs comprising user interactions with one or more applications and/or one or more services during one or more user device unlocking processes. For example, a user history may indicate that a user has been interacting with certain types of applications and/or services and has consumed certain types of contents during the last four weekends.

In step 407, the application processing manager 109 processes and/or facilitates a processing of the interaction history to determine the one or more applications, the one or more services, or a combination thereof. In various embodiments, a user interaction history may be processes, analyzed, evaluated, examined and the like in order to present one or more applications, one or more services and/or one or more contents to the user during an unlocking process of a user device.

In step 409, the application processing manager 109 causes, at least in part, an initiation of the one or more application, the one or more services, or a combination thereof based, at least in part, on the change of the device to the unlocked state. In one embodiment, the application processing manager 109, the service platform 115 and/or the content provider 113 can cause, at least in part, an initiation of one or more applications and/or one or more services based, at least in part, on a change of the user device to an, at least in part, unlocked state. For example, if a user elects to interact with a second prompt during an unlocking process of the user device, then once the user device is in the unlocked state, one or more applications and/or one or more services can be initiated for presentation to the user. For example, if during the unlocking process the user interacted with a second prompt related to a content (e.g., a food item), then once the user device is unlocked, one or more applications and/or one or more services are initiated and presented to the user in a UI wherein the user may obtain additional information related to the content. In another embodiment, one or more applications and/or one or more services initiated in the locked state may continue on to the unlocked state of the user device.

Figure 5A:
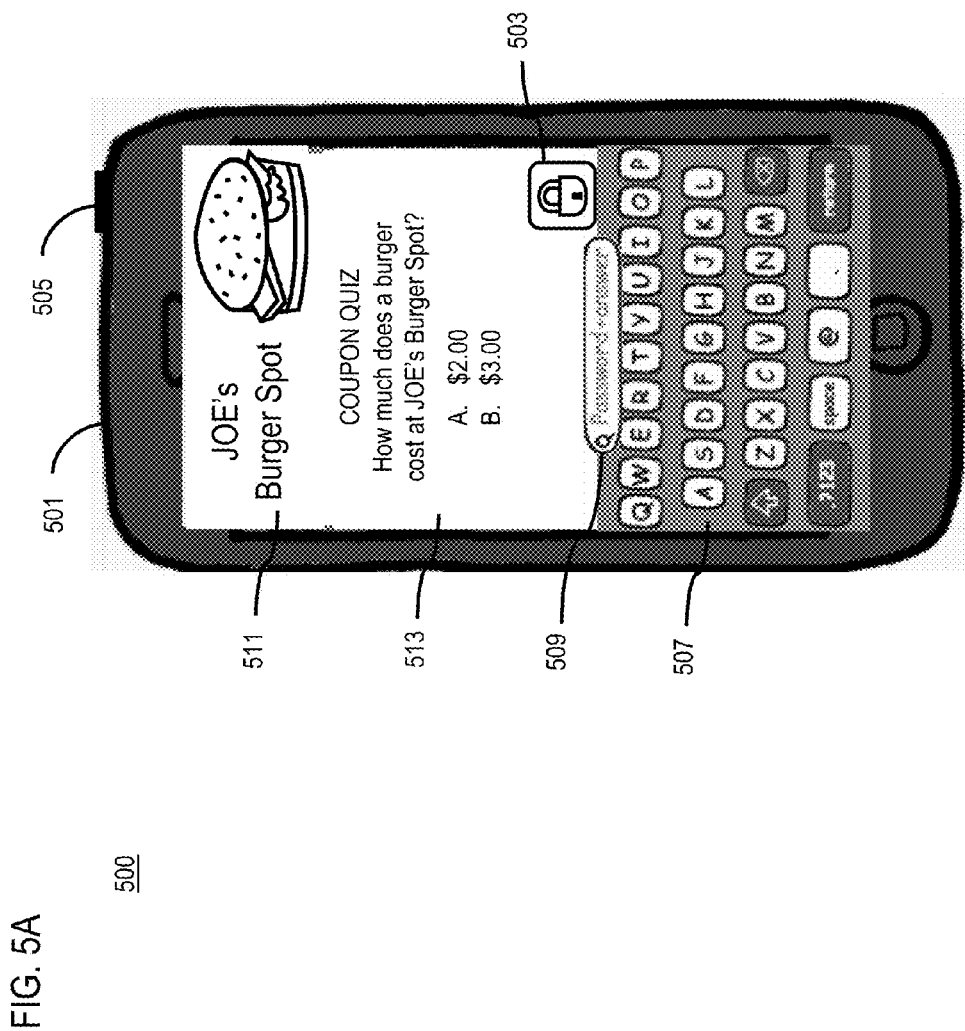

FIGS. 5A-5F are diagrams of user interfaces utilized in the processes of FIGS. 3 and 4, according to various embodiments. Each of the user interfaces illustrated in FIGS. 4A and 4B have functionality of particular applications when a device is locked. FIG. 5A shows user interface 500 on a user device 501 (e.g., UE 101) which is in an, at least in part, locked state indicated by 503. In one embodiment, one or more sensors 107 detect an interaction, for example, with power button 505 and/or a key on keypad 507 wherein application processing manager 109 causes a presentation of first user interface 509 for the user entry of a user password. Further, the application processing manager 109 causes a presentation of a second portion of a user interface 511 wherein a one or more information items can be presented. For example, a coupon quiz is by a vendor "Joe's Burger Spot", a question/challenge (e.g., "How much does a burger cost at JOE's Burger Spot) and one or more answer selections 513 are presented to the user. Further, FIG. 5B shows user interface 520 wherein the user device still is in an, at least in part, locked state 525. At this point, the user may enter a user password (e.g., "myPassword") and additionally enter answer "A" (e.g., $2.00) from the list of answers presented presenting an aggregated password of "myPassword$2.00" at 523. Furthermore, FIG. 5C illustrates user interface 540 wherein upon validation of the aggregated password the user device is unlocked 543 and one or more content items 541 (e.g., a coupon "FREE BURGER at JOE's Burger Spot"), one or more applications and/or or services are presented to the user. In another embodiment, the user does not wish to partake in the quiz and only present a user password (e.g., "myPassword") for unlocking the user device wherein the user does not receive additional content (e.g., no coupon). In another embodiment, the user presents an incorrect answer (e.g., answer selection "B") from the list 521 and therefore does not receive a coupon. In another embodiment, whether the user presents answer choice "A" or "B", preceding or succeeding the unlocking of the user device, the user is presented with a link and/or is routed to an online internet site for "JOE's Burger Spot".

Figure 5D:
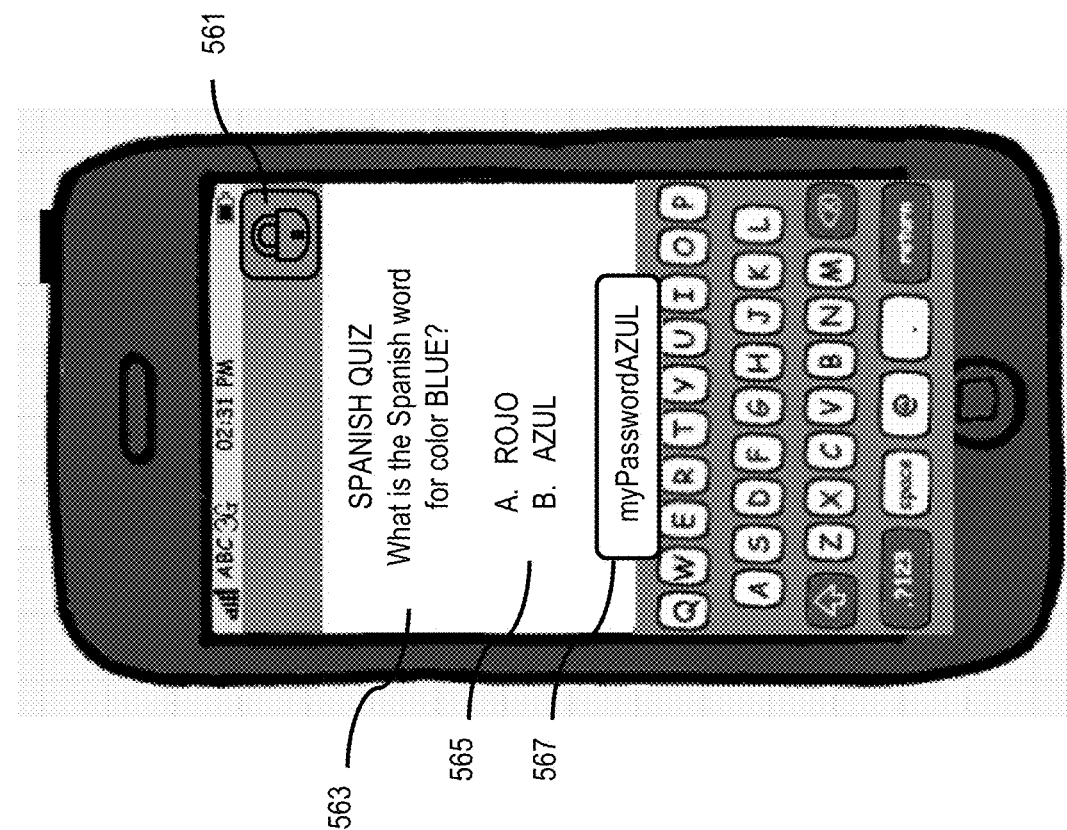

FIG. 5D shows user interface 560 wherein the user device is in an, at least in part, locked state 561 and wherein during an unlocking process of the UE 101 en educational quiz/ challenge is presented to the user of UE 101. In this example, the user is presented with a language skills quiz 563 (e.g., "What is the Spanish word for color BLUE?" and answer selections 565 wherein the user may enter an aggregated password of "myPasswordAZUL" at 567 or "myPasswordB" as a correct answer.

FIG. 5E shows user interface 580 wherein the user device is in an, at least in part, locked state 581. In one embodiment, during an unlocking process of the UE 101 a challenge and an offer 583 are presented to the user wherein the user is asked to complete a puzzle 585 in order to receive a 20% discount coupon valid at the "BIG" shopping mall whereby the user may present the user password "myPassword" at 587 and complete the puzzle in order to receive the coupon. In another embodiment, a user may store (e.g., at a local device or at a service provider) one or more coupons, offers, points, challenges, questions and the like presented during and/or after an unlocking process for future consideration.

In various embodiments, a user, one or more service providers and/or one or more content providers can configure presentation of one or more contents, services and/or applications during an unlocking process of a user device.

Figure 5F:
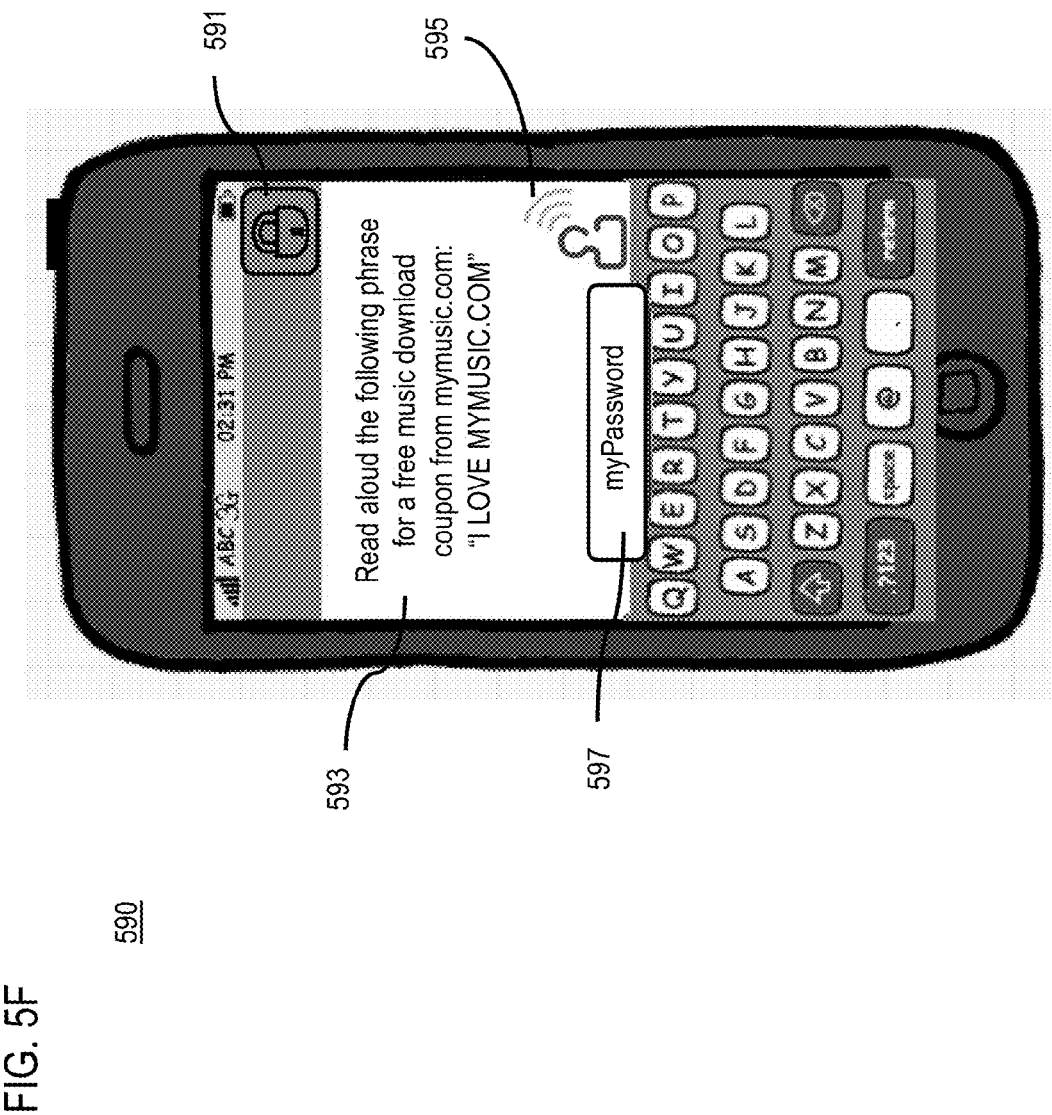

FIG. 5F shows user interface 590 wherein the user device is in an, at least in part, locked state 591. In one embodiment, during an unlocking process of the UE 101, an offer and a task 593 are presented to the user wherein the user is asked to "read aloud the following phrase for a free music download coupon from mymusic.com: "I LOVE MYMUSIC.COM"". Further, sensors 107 and/or applications 111 capture/record/process the voice of the user at 595 and a user password at 597 for further evaluation at the user device, at a service provider and/or at a content provider.

The processes described herein for increasing utility of a process for unlocking a user device while the device is in an, at least in part, locked state may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
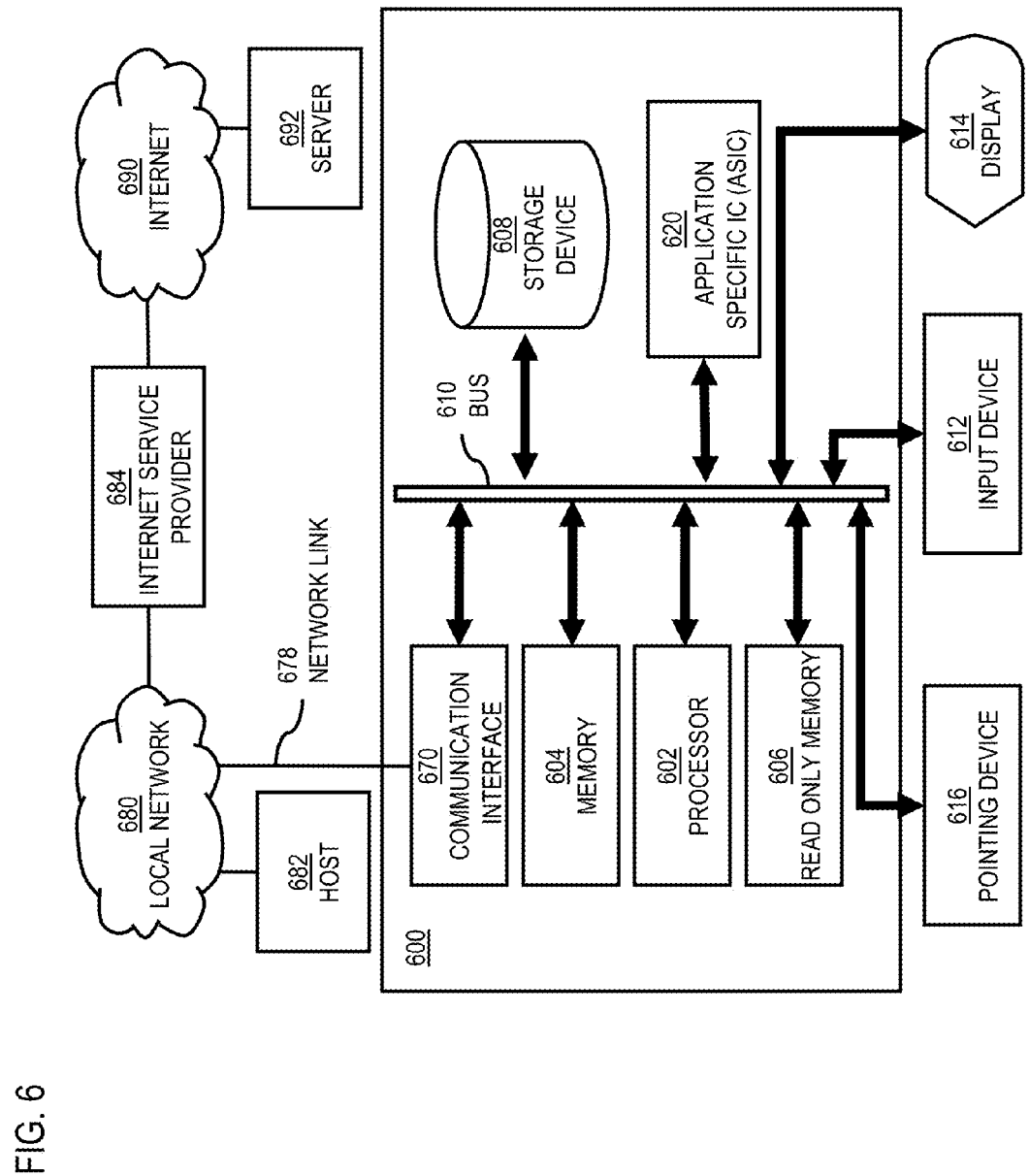
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to increase the functionality of a user device while the device is in an, at least in part, locked state as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of increasing the functionality of a user device while the device is in an, at least in part, locked state.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to increase the functionality of a user device while the device is in an, at least in part, locked state. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for increasing the functionality of a user device while the device is in an, at least in part, locked state. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for increasing the functionality of a user device while the device is in an, at least in part, locked state is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for increasing the functionality of a user device while the device is in an, at least in part, locked state to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to increase the functionality of a user device while the device is in an, at least in part, locked state as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of increasing the functionality of a user device while the device is in an, at least in part, locked state.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to increase the functionality of a user device while the device is in an, at least in part, locked state. The memory 705 also stores the data associated with or generated by the execution of the inventive steps.

Figure 8:
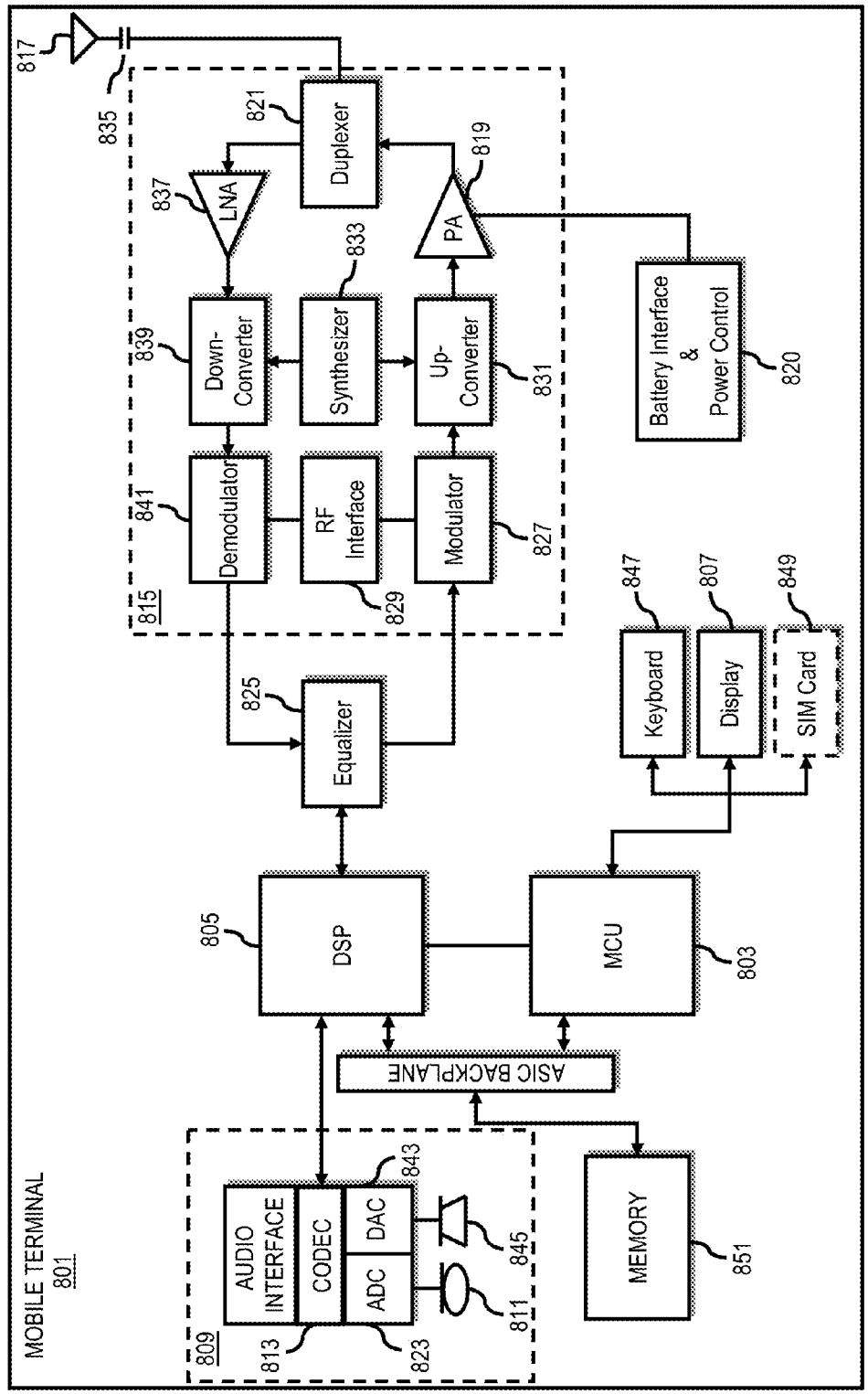
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of increasing the functionality of a user device while the device is in an, at least in part, locked state. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of increasing the functionality of a user device while the device is in an, at least in part, locked state. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to increase the functionality of a user device while the device is in an, at least in part, locked state. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:

a presentation of a first user interface associated with an, at least in part, locked state of a device;

a rendering of at least a portion of a second user interface associated with the first user interface, wherein the second user interface is associated with one or more applications, one or more services, or a combination thereof; and a processing of one or more interactions with the first user interface, the at least a portion of the second user interface, or a combination thereof to cause, at least in part, a change of the device to an, at least in part, unlocked state.

2. A method of claim 1, wherein the (1) data and/or (2) information and/or (3) at least one signal are further based, at least in part, on the following:
- a processing of the one or more interactions to determine whether to cause, at least in part, an initiation of one or more functions of the one or more applications, the one or more services, or a combination thereof.

3. A method of claim 2, wherein the one or more functions include, at least in part, a presentation of one or more content items.

4. A method of claim 3, wherein the (1) data and/or (2) information and/or (3) at least one signal are further based, at least in part, on the following:
- a caching of the one or more content items at the device.

5. A method of claim 3, wherein the (1) data and/or (2) information and/or (3) at least one signal are further based, at least in part, on the following:
- a processing of the one or more interactions to cause, at least in part, a generation of the one or more content items.

6. A method of claim 1, wherein the (1) data and/or (2) information and/or (3) at least one signal are further based, at least in part, on the following:
- a processing of the one or more interactions to determine the one or more applications, the one or more services, or a combination thereof.

7. A method of claim 1, wherein the (1) data and/or (2) information and/or (3) at least one signal are further based, at least in part, on the following:
- a generation of an interaction history based, at least in part, on the one or more interactions; and
- a processing of the interaction history to determine the one or more applications, the one or more services, or a combination thereof.

8. A method of claim 1, wherein the (1) data and/or (2) information and/or (3) at least one signal are further based, at least in part, on the following:
- an initiation of the one or more applications, the one or more services, or a combination thereof based, at least in part, on the change of the device to the unlocked state.

9. A method of claim 1, wherein the one or more applications, the one or more services, or a combination thereof relate, at least in part, to an advertising service, a polling service, a competition service, a testing service, or a combination thereof.

10. A method of claim 1, wherein the one or more applications, the one or more services, the one or more interactions are determined, at least in part, by the device, a service provider, a content provider, or a combination thereof.

11. A method of claim 1, wherein the second user interface indicates one or more tasks, one or more challenges, one or more questions, or a combination thereof and the processing further comprises:
- determining at least one interaction of the one or more interactions indicating, at least in part, a change of the device to, at least in part, the unlocked state; and
- determining whether the one or more interactions includes at least one other interaction indicating a response to the one or more tasks, one or more challenges, one or more questions, or a combination thereof.

12. An apparatus comprising:
- at least one processor; and
- at least one memory including computer program code for one or more programs,
- the at least one memory and the computer program code configured to, with the at least one processor, cause the apparatus to perform at least the following,
- cause, at least in part, a presentation of a first user interface associated with an, at least in part, locked state of a device;
- cause, at least in part, a rendering of at least a portion of a second user interface associated with the first user interface, wherein the second user interface is associated with one or more applications, one or more services, or a combination thereof; and
- process and/or facilitate a processing of one or more interactions with the first user interface, the at least a portion of the second user interface, or a combination thereof to cause, at least in part, a change of the device to an, at least in part, unlocked state.

13. An apparatus of claim 12, wherein the apparatus is further caused to:
- process and/or facilitate a processing of the one or more interactions to determine whether to cause, at least in part, an initiation of one or more functions of the one or more applications, the one or more services, or a combination thereof.

14. An apparatus of claim 13, wherein the one or more functions include, at least in part, a presentation of one or more content items.

15. An apparatus of claim 14, wherein the apparatus is further caused to:
- cause, at least in part, a caching of the one or more content items at the device.

16. An apparatus of claim 14, wherein the apparatus is further caused to:
- process and/or facilitate a processing of the one or more interactions to cause, at least in part, a generation of the one or more content items.

17. An apparatus of claim 12, wherein the apparatus is further caused to:
- process and/or facilitate a processing of the one or more interactions to determine the one or more applications, the one or more services, or a combination thereof.

18. An apparatus of claim 12, wherein the apparatus is further caused to:
- cause, at least in part, a generation of an interaction history based, at least in part, on the one or more interactions; and
- process and/or facilitate a processing of the interaction history to determine the one or more applications, the one or more services, or a combination thereof.

19. An apparatus of claim 12, wherein the apparatus is further caused to:
- cause, at least in part, an initiation of the one or more applications, the one or more services, or a combination thereof based, at least in part, on the change of the device to the unlocked state.

20. An apparatus of claim 12, wherein the one or more applications, the one or more services, or a combination thereof relate, at least in part, to an advertising service, a polling service, a competition service, a testing service, or a combination thereof.

21. An apparatus of claim 12, wherein the one or more applications, the one or more services, the one or more interactions are determined, at least in part, by the device, a service provider, a content provider, or a combination thereof.

* * * * *